United States Patent
Baumgarte et al.

(10) Patent No.: US 9,947,158 B2
(45) Date of Patent: Apr. 17, 2018

(54) ACCESS CONTROL DEVICE COMMISSIONING

(71) Applicant: Schlage Lock Company LLC, Carmel, IN (US)

(72) Inventors: Joseph Wayne Baumgarte, Carmel, IN (US); Matthew Dexter, Indianapolis, IN (US); John Evenson, Greentown, IN (US)

(73) Assignee: Schlage Lock Company LLC, Indianapolis, IN (US)

( * ) Notice: Subject to any disclaimer, the term of this patent is extended or adjusted under 35 U.S.C. 154(b) by 0 days.

(21) Appl. No.: 14/934,549

(22) Filed: Nov. 6, 2015

(65) Prior Publication Data

US 2016/0350991 A1 Dec. 1, 2016

Related U.S. Application Data

(60) Provisional application No. 62/169,061, filed on Jun. 1, 2015.

(51) Int. Cl.
*G05B 19/00* (2006.01)
*G07C 9/00* (2006.01)
(Continued)

(52) U.S. Cl.
CPC ........... *G07C 9/00309* (2013.01); *H04B 1/38* (2013.01); *H04W 4/008* (2013.01); *H04W 76/046* (2013.01); *G07C 2009/00769* (2013.01)

(58) Field of Classification Search
CPC ..... B60R 25/04; B60R 25/24; G07C 9/00103; G07C 9/00182; G07C 9/00309
(Continued)

(56) References Cited

U.S. PATENT DOCUMENTS 8,009,013 B1   8/2011   Hirschfeld et al.
8,285,212 B2   10/2012  Hulvey et al.
(Continued)

FOREIGN PATENT DOCUMENTS

CN   203260092 U    10/2013
WO   2014006615 A1   1/2014

OTHER PUBLICATIONS

International Search Report; International Searching Authority, US Patent and Trademark Office; International Application No. PCT/US2016/035196; dated Oct. 7, 2016; 4 pages.
(Continued)

*Primary Examiner* — Carlos E Garcia
(74) *Attorney, Agent, or Firm* — Taft Stettinius & Hollister LLP

(57) ABSTRACT

A system and method for enhancing the security associated with the commissioning of an access control device. According to certain embodiments, a commissioning activator is positioned to be accessible from one side of the installed access control device. Thus, the access control device may be installed such that the commissioning activator is accessible to individuals having access to a relatively secure side of the access control device. The displacement of the access control device may generate an activation signal that is detected by a processing device of the access control device. Upon detection of the activation signal, the processing device may activate an input/output device that may transmit an identification signal that is detected by a wireless configuration device. Following receipt of a connection request from the configuration device, the access control device and the configuration device can be connected such that commissioning of the access control device may proceed.

20 Claims, 3 Drawing Sheets

(51) Int. Cl.
*H04W 4/00* (2018.01)
*H04B 1/38* (2015.01)
*H04W 76/04* (2009.01)

(58) Field of Classification Search
USPC .................. 340/5.1, 5.2, 5.6, 5.61–5.64, 5.7,
340/5.71–5.74, 5.8, 5.81–5.83
See application file for complete search history.

(56) References Cited

U.S. PATENT DOCUMENTS

| | | |
|---|---|---|
| 8,624,727 B2 | 1/2014 | Saigh et al. |
| 2012/0280789 A1 | 11/2012 | Gerhardt et al. |
| 2013/0008213 A1 | 1/2013 | Brown et al. |
| 2013/0176107 A1 | 7/2013 | Dumas et al. |
| 2014/0049361 A1* | 2/2014 | Ahearn .............. G07C 9/00309 340/5.7 |
| 2014/0051425 A1 | 2/2014 | Ahearn et al. |
| 2014/0077929 A1* | 3/2014 | Dumas .............. G07C 9/00571 340/5.61 |
| 2014/0292481 A1* | 10/2014 | Dumas ............... G07C 9/00111 340/5.61 |

OTHER PUBLICATIONS

Written Opinion; International Searching Authority, US Patent and Trademark Office; International Application No. PCT/US2016/035196; dated Oct. 7, 2016; 7 pages.

\* cited by examiner

ACCESS CONTROL DEVICE COMMISSIONING

CROSS REFERENCE TO RELATED APPLICATIONS

The present application claims the benefit of U.S. Provisional Patent Application Ser. No. 62/169,061, filed Jun. 1, 2015, which is incorporated herein by reference in its entirety.

BACKGROUND

Embodiments of the present invention generally relate to commissioning of access control devices. More particularly, but not exclusively, embodiments of the present invention relate to security measures for initiating the commissioning of an access control device with a wireless device.

Security management systems often utilize access control devices, such as, for example, electronic lockset devices and credential reader devices, among other devices, to control the ingress and/or egress through an entryway. Often the installation of certain types of access control devices includes commissioning of the access control device such that the access control device becomes integrated into the security management system. For example, commissioning of an access control device may include, but is not limited to, recognizing the access control device as being part of the security management system, assigning the access control device a unique identifier within the security management system, providing the access control device with network information, and/or providing the access control device with authorization information, including, for example, an encryption key(s), among other information.

Traditionally, the commissioning of at least certain access control devices has been performed by physically attaching a configuration device to the access control device. Moreover, a physical connection, such as, for example, a wired connection, between the configuration device and the access control device provided a pathway for the exchange of information with the access control device. However, such a connection typically requires the presence of a technician at the location of the access control device during commissioning, as well the presence of mating ports, among other components, to physically couple the access control device to a configuration device.

BRIEF SUMMARY

An aspect of an embodiment of the present application is an access control device for controlling the displacement of an entryway device, the access control device being mountable on the entryway device. The access control device includes a first assembly and a second assembly, the first assembly being mountable to a first side of the entryway device and the second assembly being mountable to a second side of the entryway device. The access control device further includes a commissioning activator that is adapted to be accessible, when the access control device is operably mounted to the entryway device, from one, and only one, of the first assembly and the second assembly. Additionally, the commissioning activator is displaceable between an un-activated position and an activated position. The access control device further includes a processing device that is adapted to receive a signal when the commissioning activator is displaced to the activated position, the processing device being further adapted to, upon receipt of the signal, instruct an input/output device of the access control device to transmit an identification signal. Further, the identification signal can include a unique identifier of the access control device.

Another aspect of an embodiment of the present application is a method for commissioning an access control device, the method including receiving, by a processing device of the access control device, an activation signal indicating the displacement of a commissioning activator from an un-activated position to an activated position. Upon receipt of the activation signal by the processing device, an input/output device of the access control device can be activated. Additionally, a radio signal can be transmitted from the activated input/output device, the radio signal having a unique identifier for the access control device. Additionally, the input/output device can receive, in response to the transmitted radio signal, a connection request. The method can further include accepting, by the processing device, the connection request, and receiving by the input/output device upon acceptance of the connection request a commissioning signal containing commissioning information for the access control device.

Another aspect of an embodiment of the present application is a method for commissioning an access control device that includes detecting the displacement of a commissioning activator from an un-activated position to an activated position. Further, the commissioning activator can be externally accessible from one, and only one, side of the access control device. Upon detection of the displacement of the commissioning activator, an identification signal can be transmitted from an input/output device of the access control device. Further, the input/output device can receive, in response to the transmitted identification signal, a request for connection that can be accepted by the processing device. Additionally, the input/output device can receive, upon acceptance of the connection request, a commissioning signal containing information for commissioning the access control device.

BRIEF DESCRIPTION OF THE DRAWINGS

The description herein makes reference to the accompanying figures wherein like reference numerals refer to like parts throughout the several views.

Figure 1:
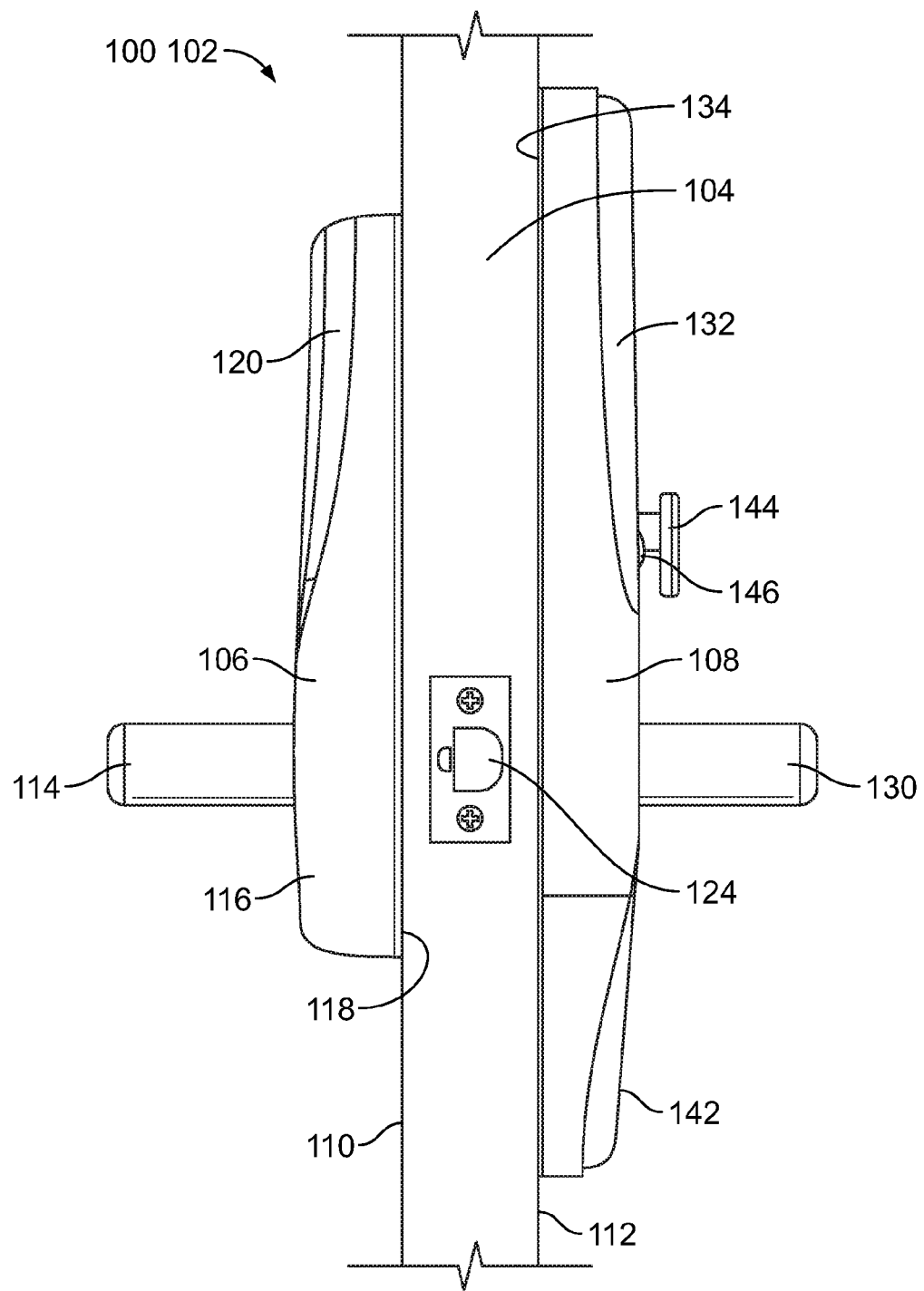
FIG. 1 illustrates a side view of exemplary first and second assemblies of an exemplary electronic lockset device that is mounted to an entryway device.

The foregoing summary, as well as the following detailed description of certain embodiments of the present invention, will be better understood when read in conjunction with the appended drawings. For the purpose of illustrating the invention, there is shown in the drawings, certain embodiments. It should be understood, however, that the present invention is not limited to the arrangements and instrumentalities shown in the attached drawings.

DESCRIPTION OF THE ILLUSTRATED EMBODIMENTS

Certain terminology is used in the foregoing description for convenience and is not intended to be limiting. Words such as "upper," "lower," "top," "bottom," "first," and "second" designate directions in the drawings to which reference is made. This terminology includes the words specifically noted above, derivatives thereof, and words of similar import. Additionally, the words "a" and "one" are defined as including one or more of the referenced item unless specifically noted. The phrase "at least one of" followed by a list of two or more items, such as "A, B or C," means any individual one of A, B or C, as well as any combination thereof.

Figure 3:
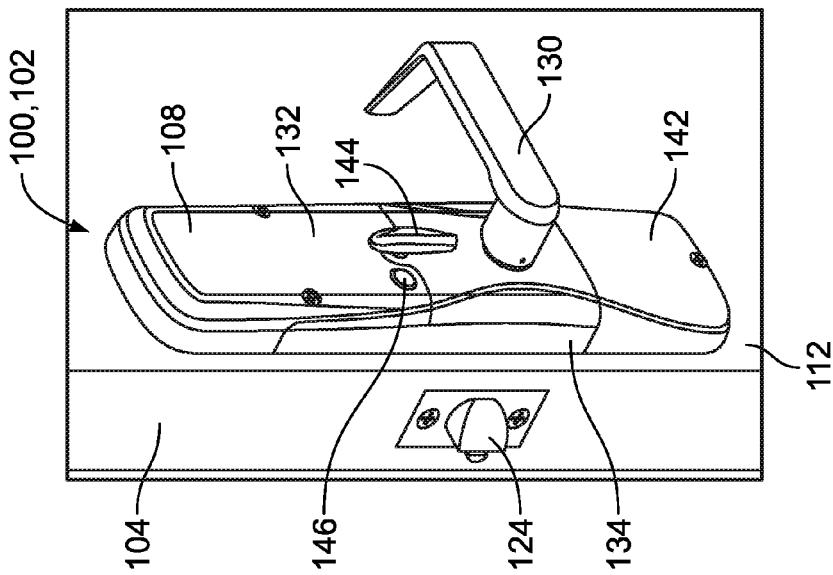
FIG. 3 illustrates a side perspective view of the second assembly of the electronic lockset device illustrated in FIG. 1 mounted against a second side of the entryway device.
Figure 2:
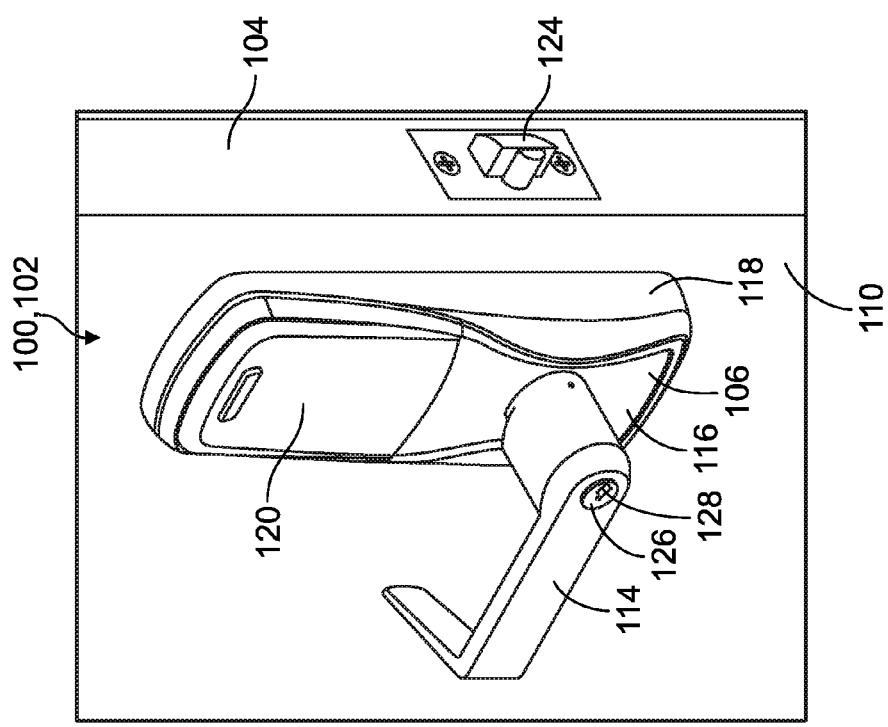
FIG. 2 illustrates a side perspective view of the first assembly of the electronic lockset device illustrated in FIG. 1 mounted against a first side of the entryway device.

FIGS. 1-3 illustrate an exemplary access control device 100 that may be utilized to at least assist in controlling ingress and/or egress through an entryway. In the illustrated embodiment, the access control device 100 is an electronic lockset device 102 that may be utilized to at least lock an entryway device 104 in at least a closed position. For example, the entryway device 104 can be a door or gate, among other barriers, that, when in a closed position relative to an entryway, prevents passage through the entryway, and thereby at least assists in controlling access to, or release from, at least one area that is adjacent to the entryway device 104. However, embodiments of the present invention may also be utilized with a variety of other types of access control devices 100. For example, according to certain embodiments, the access control device 100 can be a credential reader device, such as, for example, a reader device that reads a credential on a card or badge, among other credential devices. Similarly, according to certain embodiments, the access control device 100 may include an exit device, such as, for example, a push bar or push pad exit device that includes a lock mechanism having a latch assembly. Alternatively, according to certain embodiments, the access control device 100 can be a payment terminal and/or a door closer. Further, according to certain embodiments, the access control device 100 may be a combination of two or more access control devices.

According to the illustrated embodiment, the electronic lockset device 102 may include a first assembly 106 and a second assembly 108 mounted on opposing sides of the entryway device 104. For example, the first assembly 106 may be mounted, or otherwise positioned adjacent to, a first side 110 of the entryway device 104, while the second assembly 108 may be mounted, or otherwise adjacent, to a second, opposing side 112 of the entryway device 104. Further, according to certain embodiments, the first and second sides 110, 112 of the entryway device 104 may correspond to positions or locations relative to an area and/or space that is adjacent to the entryway. For example, according to certain embodiments, the entryway device 104 may be used in controlling entry into, and/or release from, a room, structure, or space. Thus, according to certain embodiments, when the entryway device 104 is at least in a closed position relative to at least the entryway, one of the first and second sides 110, 112 of the entryway device 104, and thus one of the first and second assemblies 106, 108, may generally be directed toward an inside region of the room, structure, or space, while the other of the first and second sides 110, 112 of the entryway device 104, and thus the other of the first and second assemblies 106, 108, is directed to an outside region the room, structure, or space.

Referencing FIG. 2, according to the illustrated embodiment, the first assembly 106 of the electronic lockset device 102 is an outside assembly, and thus the first side 110 of the entryway device 104 is an outside portion of the entryway device 104. Further, according to the illustrated embodiment, the first assembly 106 includes a first lever 114, a first escutcheon plate 116, and a first backing plate 118. According to the illustrated embodiment, the first assembly 106 may include a credential reader interface structured to read at least one type of credential, including, but not limited to, a prox and/or NFC (i.e., smart card). However, the credential reader interface 120 (FIG. 4) may receive identification information in a variety of other manners, including, for example, through the use of a fingerprint or retinal scan, keypad entry, and/or wireless communication. According to certain embodiments, the first escutcheon plate 116 and a portion of the first backing plate 118 may generally house an inner region that is sized to house at least a portion of the credential reader interface 120.

According to the illustrated embodiment, the electronic lockset device 102 includes a lock mechanism 122 (FIG. 4), such as, for example, a lock mechanism 122 having a selectively displaceable latch or bolt 124 that may engage or extend into an adjacent wall, frame, or component in a manner that may secure the entryway device 104 in the closed position. The lock mechanism 122 may also be operably coupled to the first lever 114 of the first assembly 106 such that, when the lock mechanism 122 is in an unlocked condition, rotational displacement of the first lever 114 from a first position to a second position may inwardly displace the latch or bolt 124 from an extended position to an at least partially retracted position such that the latch or bolt 124 does not impede the entryway device 104 from being displaced from the closed position to an open position. Additionally, according to certain embodiments, the lock mechanism 122 may also include a lock cylinder 126 having a keyway 128 that is accessible from the first side of the entryway device 104. The lock cylinder 126 may have a variety of different configurations, including, but not limited to, a pin and tumbler, mortise, and tubular lock configuration, among others.

Referencing FIG. 3, the second assembly 108 of the electronic lockset device 102 may include a second lever 130 that, like the first lever 114, is operably coupled to the lock mechanism 122. Thus, rotational displacement of the second lever 130 from a first position to a second position may rotably displace, when the lock mechanism 122 is in an unlocked condition, inwardly displace the latch or bolt 124 from an extended position to an at least partially retracted position such that the latch or bolt 124 does not impede the entryway device 104 from being displaced from the closed position to an open position.

Figure 4:
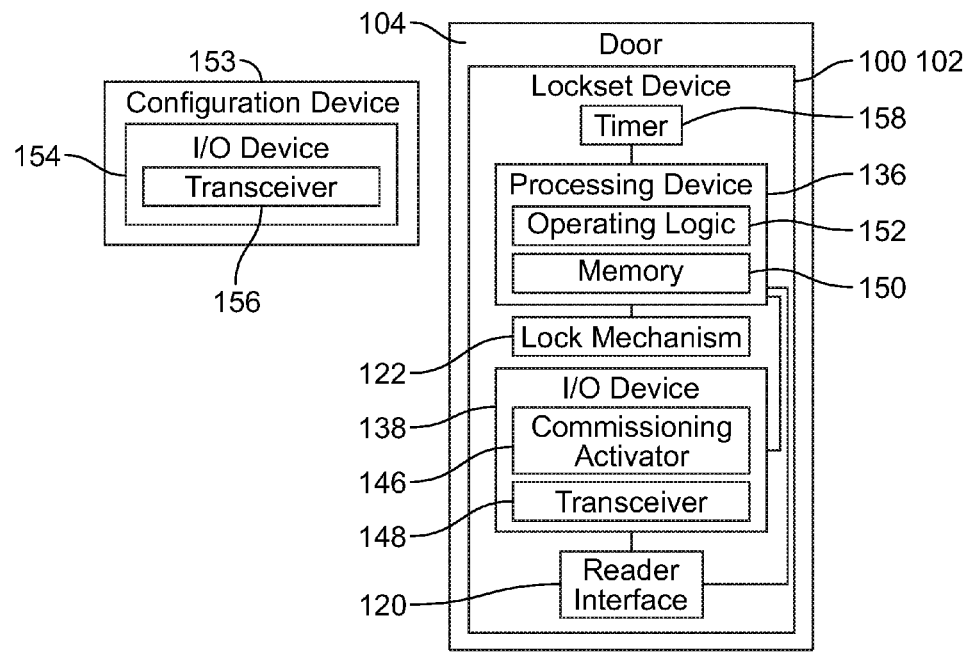
FIG. 4 illustrates a schematic block diagram of an exemplary lockset device and an external wireless configuration device.

The second assembly 108 may also include a second escutcheon plate 132, and a second backing plate 134. The second escutcheon plate 132 and a portion of the second backing plate 134 may generally define a first inner region within the second assembly 108 that houses one or more components of the electronic lockset device 102, such as, for example, a processing device 136 and/or at least a portion of an input/output device 138, as shown in FIG. 4, among other components. Additionally, according to certain embodiments in which the electronic lockset device 102 is battery powered, the lockset device 102 may also include a second inner region that is generally defined by a battery cover 142 and a portion of the second backing plate 134. According to the illustrated embodiment, the second inner region is sized to accommodate at least the operable placement of one or more batteries that provide at least a portion of the electrical power that is used to operate the electronic lockset device 102.

Optionally, the second assembly 108 may further include a thumbturn 144 that is operably coupled to the lock mechanism 122, and which provides a mechanism by which a user on one side of the entryway device 104 may manually lock and unlock the lockset device 102. According to such an embodiment, rotable displacement of the thumbturn 144 may outwardly displace the latch or bolt 124 to an extended, locked position and/or secure the lock mechanism in the locked position, while rotable displacement of the thumbturn 144 in a second, opposite direction may inwardly displace the latch or bolt 124 to an retracted, unlocked position and/or secure the lock mechanism in the unlocked position. Alternatively, rather than being a rotable thumbturn 144, the user may depress a button that facilitates the displacement of the latch or bolt 124 between the extended locked position and the retracted, unlocked position.

One of the first or second assemblies 106, 108 further includes a commissioning activator 146 that can be used in connection with the commissioning of the access control device 100, which in this example is, again, an electronic lockset device 102. As discussed below, according to certain embodiments, activation of the commissioning activator 146 may initiate the transmission of a signal from an input/output device 138 (FIG. 4) of the lockset device 102 that uniquely identifies the lockset device 102, and which is received by other external devices. For example, the activation of the commissioning activator 146 may initiate the transmission of a signal from the transceiver 148 that allows the access control device 100 to be seen by external, devices, such as, for example, an external wireless commissioning activator 146 (FIG. 4) that is utilized to configure the access control device 100 to be part of a security management system.

According to certain embodiments, the commissioning activator 146 may be a button, switch, or other device that may be manually engaged by a user, such as, for example, by a digit of a user such that the commissioning activator 146 is displaceable between an un-activated portion and an activated position. Further, according to certain embodiments, the commissioning activator 146 may be biased to the un-activated position, such as, for example, by a spring. Additionally, the commissioning activator 146 may be engaged by the user from one side of the electronic lockset device 102. For example, in the illustrated embodiment, the commissioning activator 146 may include a button that is accessible from the second assembly 108 of the lockset device 102, and more specifically, may be depressed by a user that has access to the second assembly 108 of the lockset device 102 when the entryway device 104 is in a closed position relative to the entryway. Thus, according to embodiments in which the second assembly 108 is positioned at an inside location, access to engage the commissioning activator 146 may generally be limited to those users who have authorization to be at an inside location of the associated room, structure, or space. Moreover, in such an example, unauthorized users who may be generally limited to access to the first assembly 106, but not the second assembly 108 of the electronic lockset device 102, may have limited, if any, access to the commissioning activator 146. Accordingly, such limitations in the ability to operably engage the commissioning activator 146 may limit those individuals who may at least attempt to commission the access control device 100, and thereby limit at least opportunities to tamper with the commissioning of the access control device 100. In particular, generally only users with access to the secured side of the door are able to start the commissioning process. Accordingly, incorporating the activation of the limitedly accessible commissioning activator 146 into the procedure for commissioning the access control device 100, which in this example is the electronic lockset device 102, may add an additional level of security in the commissioning of the access control device 100.

According to certain embodiments, the commissioning activator 146 may have multi-functionality. Moreover, the commissioning activator 146 may be utilized for operations of the access control device 100 in addition to uses in the commissioning of the access control device 100. For example, according to certain embodiments, the commissioning activator 146 may be a request for exit (REX) switch. Thus, according to certain embodiments, operable engagement of the REX switch, and thus the commissioning activator 146, may initiate the transmission(s) of a signal(s) that may both identify access control device 100 in connection with the commissioning of the access control device 100, and also notify another external device(s) that someone is seeking to exit, and/or is exiting, through the entryway.

FIG. 4 illustrates a schematic block diagram of an exemplary lockset device 102 and an external wireless commissioning activator 146. As depicted, the lockset device 102 includes a processing device 136, memory 150, operating logic 152, lock mechanism 122, and one or more input/output devices 138. Optionally, according to the illustrated embodiment, the lockset device 102 may further include a reader interface 120. The processing device 136 of the lockset device 102 can be a programmable type, a dedicated, hardwired state machine, or any combination of these. The processing device 136 may further include multiple processors, Arithmetic-Logic Units (ALUs), Central Processing Units (CPUs), Digital Signal Processors (DSPs), or the like. The processing device 136 may be multiple processing units that utilize distributed, pipelined, and/or parallel processing. Further, the processing device 136 may be dedicated to performance of just the operations described herein or may be utilized in one or more additional applications. In the depicted form, the processing device 136 is of a programmable variety that executes algorithms and processes data in accordance with operating logic 152 as defined by programming instructions (such as software or firmware) stored in memory 150. Alternatively or additionally, the operating logic 152 for the processing device 136 is at least partially defined by hardwired logic or other hardware. The processing device 136 may include one or more components of any type suitable to process the signals received from the input/output device 138 or elsewhere, and to provide desired output signals. Such components may include digital circuitry, analog circuitry, or a combination of both.

The memory 150 may be of one or more types, such as a solid-state variety, electromagnetic variety, optical variety, or a combination of these forms. Furthermore, the memory 150 can be volatile, nonvolatile, or a combination of these types, and some or all of the memory 150 can be of a portable variety, such as a disk, tape, memory stick, cartridge, or the like. In addition, the memory 150 can store data that is manipulated by the operating logic 152 of the processing device 136, such as data representative of signals received from and/or sent to the input/output device 138 in addition to or in lieu of storing programming instructions defining the operating logic 152, just to name one example.

As shown in FIG. 4, the memory 150 may be included with the processing device 136 and/or coupled to the processing device 136.

Additionally, various aspects of the operations or processes of the access control devices 100 may be implemented in the operating logic 152 as operations by software, hardware, artificial intelligence, fuzzy logic, or any combination thereof, or at least partially performed by a user or operator. In certain embodiments, operations represent software elements as a computer program encoded on a computer readable medium, wherein a processor of the lockset device 102 performs the described operations when executing the computer program.

The input/output device 138 allows the lockset device 102 to communicate with one or more external devices, including, for example, the wireless commissioning activator 146. For example, the input/output device 138 may be a transceiver, network adapter, network card, interface, or a port (e.g., a USB port, serial port, parallel port, an analog port, a digital port, VGA, DVI, HDMI, FireWire, CAT 5, or any other type of port or interface) The input/output device 138 may include hardware, software, and/or firmware. It is contemplated that the input/output device 138 will include more than one of these adapters, cards, or ports.

According to certain embodiments, the input/output device 138 includes a wireless transceiver 148, such as, for example, a wireless transceiver 148 that may receive and/or transmit a radio signal. For example, according to certain embodiments, the input/output device 138 includes a Bluetooth Low Energy (BLE) transceiver and/or a WIFI transceiver. Moreover, it is contemplated that in some embodiments the lockset device 102 may include both a Bluetooth Low Energy (BLE) transceiver and a WIFI transceiver.

The external devices with which the input/output device 138 of the lockset device 102 may communicate with and/or to, including, for example, the wireless configuration device 153, may be any type of device that allows data to be inputted or outputted from the lockset device 102. For example, the external device may be a switch, a router, a firewall, a server, a database, a mobile device, a networking device, a controller, a computer, a processing system, a printer, a display, an alarm, an illuminated indicator such as a status indicator, a keyboard, a mouse, or a touch screen display. Furthermore, it is contemplated that the external device may be integrated into the lockset device 102. It is further contemplated that there may be more than one external device in communication with the lockset device 102.

According to certain embodiments, the wireless configuration device 153 is a portable electronic device, such as, for example, a personal electronic device, including, but not limited to, a smartphone and a tablet computer, and the like. The wireless configuration device 153 may include an input/output device 156 having a transceiver 156 that allows the wireless configuration device 153 to transmit and/or receive a variety of different types of information to/from the transceiver 148 of the access control device 100, including, for example, device identification information, information regarding activation or deactivation of the access control device 100, security and/or authorization information, and diagnostic results, among other types of information. The transceivers 148, 156 of the access control device 100 and the wireless configuration device 153 may be adapted to transmit and/or receive information in a variety of formats. For example, according to certain embodiments, the access control device 100 and the wireless configuration device 153 may communicate via a wireless communication protocol such as WI-FI and/or Bluetooth Low Energy (BLE). Additionally, according to certain embodiments, the wireless configuration device 153 and/or the access control device 100 may communicate with a server, access control panel, and/or other access control devices, among other components of the security management system.

Figure 5:
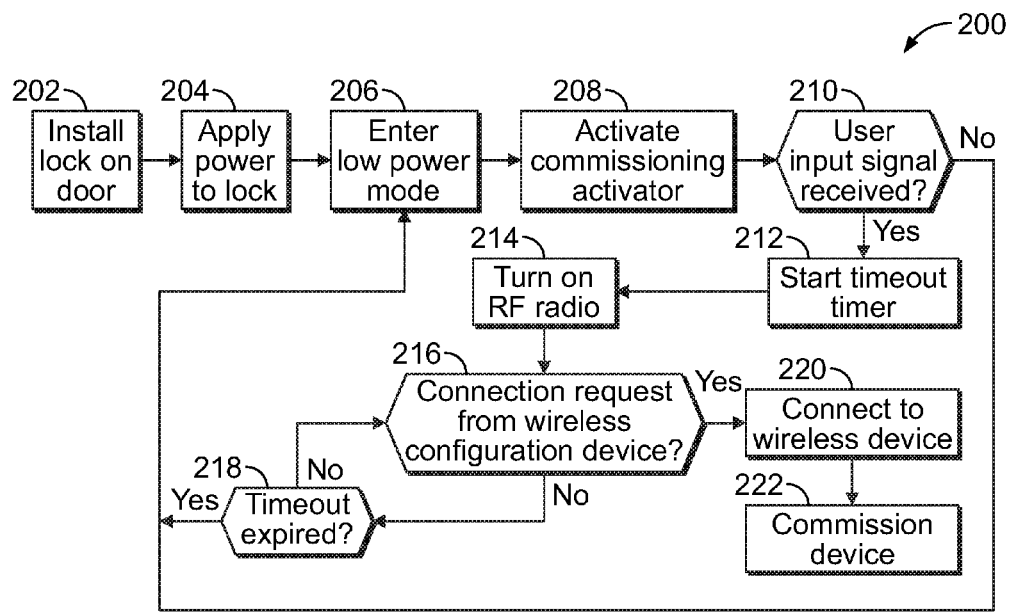
FIG. 5 illustrates a schematic flow diagram of an exemplary process for commissioning an electronic lockset device.

FIG. 5 illustrates a schematic flow diagram of an exemplary process 200 for commissioning an access control device 100, and more specifically, in this example, the commissioning of the exemplary lockset device 102. The operations illustrated for all of the processes in the present application are understood to be examples only, and operations may be combined or divided, and added or removed, as well as re-ordered in whole or in part, unless explicitly stated to the contrary.

At step 202, the lockset device 102 may be installed or mounted on an entryway device 104, such as, for example, a door. At step 204, power may be applied to the lockset device 102. For example, according to the illustrated embodiment, at step 204, batteries may be operably positioned in battery terminals in the second inner region of the second assembly 108 that is generally defined by the battery cover 142 and a portion of the second backing plate 134, as previously discussed. However, according to other embodiments, rather than utilizing batteries, the lockset device 102, or other access control device 100, may be hardwired to a power supply. Optionally, following mounting to the entryway device 104, and moreover during periods of relative inactivity, at step 206 the lockset device 102 may enter a lower power or hibernation mode in which the lockset device 102 at least attempts to minimize the consumption of electrical power.

At step 208, a user may engage the commissioning activator 146. As previously discussed, the commissioning activator 146 may be accessible to a user of the lockset device 102 from only one side of the lockset device 102. For example, as previously discussed, the commissioning activator 146 may be accessible to a user only from a second, inner assembly of the lockset device 102. By having the commissioning activator 146 positioned at a relatively secure side of the lockset device 102, and moreover a relatively secure side of the entryway device 104, the lockset device 102 can provide an extra level of security that will at least attempt to prevent the lockset device 102 from being commissioned by an unauthorized user and/or commissioned using an unauthorized wireless configuration device 153.

According to certain embodiments, the installer or user may engage and activate the commissioning activator 146 by inwardly displace the commissioning activator 146. Further, according to certain embodiments, such displacement of the commissioning activator 146 may generate an activation or user input signal that is detected by the processing device 136 at step 210. Upon detection of the activation signal the processing device 136 may, at step 212, initiate the start of a timeout timer 158 (FIG. 4) of the lockset device 102. Additionally, upon detection of the activation signal, the processing device 136 may, at step 214, provide instructions to the input/output device 138 that activates the transceiver 148 of the lockset device 102. Alternatively, according to other embodiments, rather than utilizing the commissioning activator 146, the processing device may proceed with providing instructions to the input/output device 138 that activates the transceiver 148 of the lockset device 102 upon power being applied to the lockset device 102 at step 204.

With the transceiver 148 activated, the transceiver 148 may transmit a signal that uniquely identifies the lockset device 102 that is seen or detected by external devices, such as, for example, the wireless configuration device 153. For example, according to certain embodiments, the transceiver 148 of the lockset device 102 may transmit BLE or WIFI signals for receipt or detection by at least the transceiver 156 of the wireless configuration device 153.

At step 216, the lockset device 102, such as, for example, the processing device 136, may determine whether the lockset device 102 has received a request for connection from another device, such as, for example, for the wireless configuration device 153, among other devices. If the lockset device 102 has not received a request for connection, then the lockset device 102, such as the processing device 136, may determine at step 218 whether the timer 158 has reach or exceeded a predetermined value or time period. Moreover, if the processing device 136 determines that the timeout has occurred, then the lockset device 102 may return to a low power mode of step 206. By returning to the low power mode, the lockset device 102 may deactivate the transceiver 148 such that the transmissions of signals that uniquely identify the lockset device 102 are suspended until the commissioning activator 146 is again activated. Such timeouts may occur for a variety of different reasons. For example, such timeouts may occur at least when the commissioning activator 146 is activated used for purposes other than commissioning of the lockset device 102. Moreover, as previously mentioned, according to certain embodiments, the lockset device 102 may be utilized for functions in addition to the commissioning of the lockset device 102. For example, according to certain embodiments, the activation of the commissioning activator 146 may also occur in instances in which the commissioning activator 146 is being utilized as an REX switch. Thus, in such a situation, the wireless commissioning device 153 may not be currently be used for the commissioning of the lockset device 102, and thus the lockset device 102 may not receive a request for connection before the timeout of the timer 158. If however at step 218 it is determined that a timeout has not occurred, then the lockset device 102, such as the processing device 136, may continue to determine at step 216 whether a connection request has been received by the lockset device 102.

In the event a connection request is received by the lockset device 102 from an external device, such as, for example, a connection request from the wireless commissioning device 153, the lockset device 102 may, at step 220, connect with that external device, such as, for example, connect with the wireless commissioning device 153. Such a connection may, according to certain embodiments, include an evaluation of certain identification or authorization information in at least an attempt to verify the authenticity of the requested connection and/or the subsequent connection. With the connection established between the appropriate external device, in this example the wireless commissioning device 153, the commissioning of the lockset device 102 may commence at step 222.

Additionally, according to certain embodiments, the above-discussed process 200 may also be employed to transmit certain information from a host device, such as, for example, a server, including, but not limited to, a cloud based server, among other devices, to the lockset device 102. Such transmitted information may be directly between the host and the lockset device 102, and/or indirect, such as, for example, through use of the wireless commissioning device 153, among other devices or combination of devices. For example, according to certain embodiments, during installation, upon or after notification from the wireless commissioning device 153 to the host of the detection by the wireless commissioning device 153 of the unique identifier signal of the lockset device 102, the host may communicate to the wireless commissioning device 153 one or more security parameters or features. Such security parameters or features may include a variety of different types of information that is to be communicated to, and stored by, the lockset device 102, such as, for example, one or more encryption keys. According to such an embodiment, during commissioning of the lockset device 102, the security parameters or features that were communicated from the host to the commission device 153 can be received by the lockset device 102 from the commissioning device 153. Alternatively, according to other embodiments, the wireless commissioning device 153 may have received the one or more security parameters or features prior to detection of the unique identifier signal from the lockset device 102. Additionally, according to other embodiments, the commissioning of the lockset device 102 may include the lockset device 102 receiving the one or more security parameters or features from the host in response to notification to the host of the detection of the unique identifier signal, of the lockset device 102 by the wireless commissioning device 153.

It is contemplated that the various aspects, features, computing devices, processes, and operations from the various embodiments may be used in any of the other embodiments unless expressly stated to the contrary.

While the invention has been described in connection with what is presently considered to be the most practical and preferred embodiment, it is to be understood that the invention is not to be limited to the disclosed embodiment (s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

The invention claimed is:

1. An access control device for controlling the displacement of an entryway device of a building, the access control device being mountable on the entryway device and comprising:

a first assembly and a second assembly, the first assembly mountable to a first side of the entryway device, the second assembly mountable to a second side of the entryway device of the building;

a physical commissioning activator structured to be accessible, when the access control device is operably mounted to the entryway device, from one, and only one, of the first assembly and the second assembly, the commissioning activator being physically displaceable between an un-activated position and an activated position, wherein displacement from the un-activated position to the activated position commences commissioning of the access control device to a security management system by causing generation of a signal; processing device; and a memory comprising a plurality of instructions stored thereon that, when executed by the processing device, causes the processing device to:

receive the signal in response to the commissioning activator being displaced to the activated position, and upon receipt of the signal, instruct an input/output device of the access control device to transmit an identification signal, the identification signal including a unique identifier of the access control device.

2. The access control device of claim 1, wherein the access control device further includes a lock mechanism coupled to the first assembly and the second assembly, the lock mechanism having a bolt structured to be displaced between an extended position and a retracted position.

3. The access control device of claim 2, wherein the commissioning activator includes a button that is structured to be displaced between the activated and un-activated positions, and wherein the button is biased toward the un-activated position.

4. The access control device of claim 2, wherein the first assembly includes a reader interface, and wherein the second assembly includes the commissioning activator.

5. The access control device of claim 4, wherein the first assembly includes a first lever and the second assembly includes a second lever, the first and second levers being coupled to the lock mechanism and rotatably displaceable between a first position and a second position.

6. The apparatus of claim 5, wherein the input/output device includes a transceiver, the transceiver being structured to transmit the identification signal as either a Bluetooth low energy signal or a WIFI signal.

7. The access control device of claim 1, wherein the plurality of instructions further causes the processing device to:

activate, upon receipt of the signal by the processing device indicating displacement of the commissioning activator to the activated position, the input/output device of the access control device for transmittal of the identification signal;

accept a connection request from a wireless commissioning device received by the input/output device in response to the transmittal of the identification signal by the input/output device; and receive via the input/output device, upon acceptance of the connection request, a commissioning signal containing commissioning information for the access control device.

8. The access control device of claim 7, wherein the commissioning activator is a request for exit switch.

9. The access control device of claim 8, wherein the request for exit switch transmits a signal in response to detection of an exit attempt of a user using the access control device.

10. The access control device of claim 7, wherein the plurality of instructions further causes the processing device to:

initiate a timer after transmittal of the identification signal;

determine whether the timer has reached a timeout period; and deactivate the input/output device if the timer is determined to have reached the timeout period.

11. The access control device of claim 10, wherein the plurality of instructions, when executed by the processing device, causes the access control device to enter a low power mode in response to deactivation of the input/output device.

12. The access control device of claim 11, wherein the input/output device includes a transceiver, the transceiver being structured to transmit the identification signal as one of a Bluetooth low energy signal or a WIFI signal.

13. An access control device for controlling the displacement of an entryway device, the access control device being mountable on the entryway device and comprising:

a first assembly and a second assembly, the first assembly mountable to a first side of the entryway device, the second assembly mountable to a second side of the entryway device;

a commissioning activator structured to be accessible, when the access control device is operably mounted to the entryway device, from one, and only one, of the first assembly and the second assembly, the commissioning activator being physically displaceable between an un-activated position and an activated position;

a processing device structured to receive a signal from the commissioning activator in response to the commissioning activator being displaced to the activated position, the processing device further structured to, upon receipt of the signal, instruct an input/output device of the access control device to transmit an identification signal, the identification signal including a unique identifier of the access control device;

wherein the access control device further includes a lock mechanism coupled to the first assembly and the second assembly, the lock mechanism having a bolt structured to be displaced between an extended position and a retracted position; and wherein the commissioning activator is a request for exit switch.

14. The access control device of claim 13, wherein the processing device is further structured to:

receive a request for connection from a wireless commissioning device via the input/output device in response to the transmitted identification signal;

accept the received request for connection; and receive via the input/output device, upon acceptance of the connection request, a commissioning signal containing information for commissioning the access control device.

15. The access control device of claim 14, wherein the commissioning signal includes network information for a security management system.

16. The access control device of claim 14, wherein the processing device is further structured to:

initiate a timer after transmitting the identification signal;

determine whether the timer has reached a timeout period; and deactivate the input/output device if the timer is determined to have reached the timeout period.

17. The access control device of claim 16, wherein the processing device is further structured to cause the access control device to enter a low power mode upon deactivation of the input/output device.

18. The access control device of claim 14, wherein the input/output device includes a transceiver, the transceiver being structured to transmit the identification signal as one of a Bluetooth low energy signal or a WIFI signal.

19. The access control device of claim 13, wherein the request for exit switch transmits a signal in response to detection of an exit attempt of a user using the access control device.

20. The access control device of claim 13, wherein the access control device comprises a push bar exit device.

* * * * *